US012181608B2

(12) United States Patent
Krishnan et al.

(10) Patent No.: US 12,181,608 B2
(45) Date of Patent: Dec. 31, 2024

(54) ROTATING SENSOR ASSEMBLY

(71) Applicant: Ford Global Technologies, LLC, Dearborn, MI (US)

(72) Inventors: Venkatesh Krishnan, Canton, MI (US); Raghuraman Surineedi, Dearborn, MI (US); Michael Robertson, Jr., Garden City, MI (US); Rashaun Phinisee, Ypsilanti, MI (US); Segundo Baldovino, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1011 days.

(21) Appl. No.: 17/159,479

(22) Filed: Jan. 27, 2021

(65) Prior Publication Data

US 2022/0236382 A1    Jul. 28, 2022

(51) Int. Cl.
  *G01S 7/481*  (2006.01)
  *G01S 17/931* (2020.01)

(52) U.S. Cl.
  CPC .......... *G01S 7/4817* (2013.01); *G01S 7/4813* (2013.01); *G01S 17/931* (2020.01)

(58) Field of Classification Search
  CPC ..... G01S 7/4817; G01S 7/4813; G01S 17/931
  See application file for complete search history.

(56) References Cited

U.S. PATENT DOCUMENTS

| 9,380,190 | B2 | 6/2016 | Pawlowski | |
| 10,307,800 | B1* | 6/2019 | Lombrozo | G02B 27/0006 |
| 10,307,900 | B1 | 6/2019 | Lombrozo | |
| 2018/0217242 | A1* | 8/2018 | Lombrozo | G06T 7/00 |
| 2018/0329065 | A1* | 11/2018 | Pacala | H04B 10/503 |
| 2018/0354469 | A1* | 12/2018 | Krishnan | G01S 17/931 |
| 2019/0193688 | A1 | 6/2019 | Lombrozo | |
| 2020/0191918 | A1* | 6/2020 | Ellgas | G01S 7/4043 |

\* cited by examiner

*Primary Examiner* — Isam A Alsomiri
*Assistant Examiner* — Joseph C Fritchman
(74) *Attorney, Agent, or Firm* — Frank A. MacKenzie; Bejin Bieneman PLC

(57) ABSTRACT

A sensor assembly includes a base, a housing mounted to the base and rotatable relative to the base around an axis in a direction of rotation, a sensing apparatus inside the housing and rotatable with the housing, and a sensor window extending from a point on the housing in a direction that is radially outward and circumferential relative to the axis. The sensor window is flat. The sensing apparatus has a field of view through the sensor window. An exterior surface of the sensor window faces in a direction that is radially outward and circumferentially in the direction of rotation relative to the axis.

17 Claims, 3 Drawing Sheets

ROTATING SENSOR ASSEMBLY

BACKGROUND

Vehicles, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectro-mechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

Figure 1:
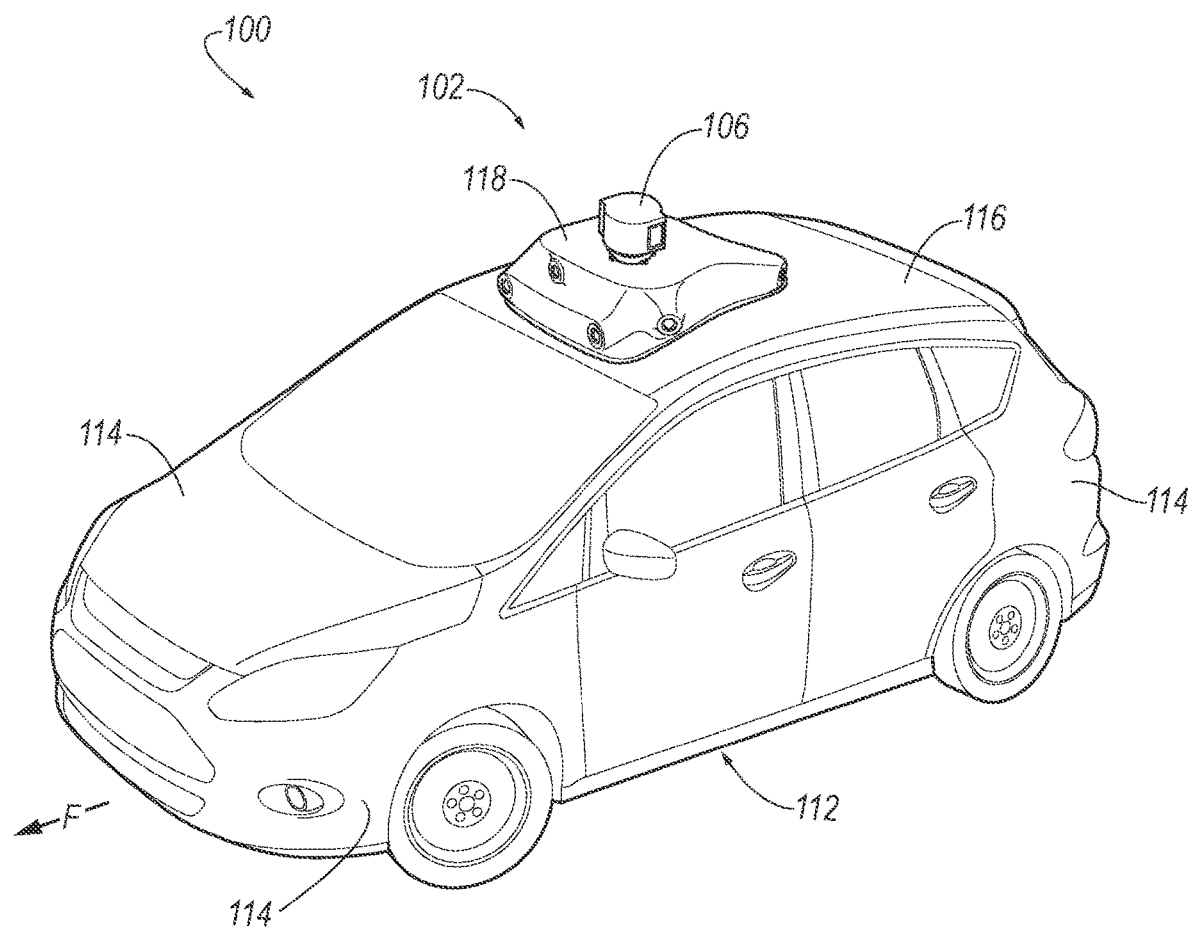
FIG. 1 is a perspective view of an example vehicle including an example sensor assembly.

A sensor assembly includes a base, a housing mounted to the base and rotatable relative to the base around an axis in a direction of rotation, a sensing apparatus inside the housing and rotatable with the housing, and a sensor window extending from a point on the housing in a direction that is radially outward and circumferential relative to the axis. The sensor window is flat. The sensing apparatus has a field of view through the sensor window. An exterior surface of the sensor window faces in a direction that is radially outward and circumferentially in the direction of rotation relative to the axis.

The sensor assembly may further include a motor arranged to rotate the housing in the direction of rotation relative to the base.

The housing may include an outer wall having a partial cylindrical shape extending circumferentially at a constant outer radius from the axis. The outer wall may extend circumferentially around the axis for at least 90°.

The sensor window may be disposed farther from the axis than the outer radius of the outer wall.

The sensor window may extend from a point nearest the outer wall in the direction that is radially outward and circumferential relative to the axis. The housing may include a window wall, the window wall may have an opening in which the sensor window is positioned, the window wall may be flat and parallel to the sensor window, and the window wall may border the outer wall. The window wall may extend in a direction tangent to the outer wall.

The sensor window may be recessed in the window wall.

The housing may include a nonwindow wall, the nonwindow wall may border the window wall, and an exterior surface of the nonwindow wall may face in a direction that is radially outward and circumferentially away from the direction of rotation relative to the axis. The outer wall, the window wall, and the nonwindow wall may have a constant cross-section along the axis from a bottom of the sensor window to a top of the sensor window.

The outer wall, the window wall, and the nonwindow wall may collectively extend 180° around the axis. The sensor window may be a first sensor window, the outer wall may be a first outer wall, the window wall may be a first window wall, the nonwindow wall may be a first nonwindow wall, and the housing may include a second outer wall, a second window wall, and a second nonwindow wall that are rotationally symmetric by 180° around the axis with respect to the first outer wall, the first window wall, and the first nonwindow wall.

The sensor window may extend circumferentially around the axis for at most 45°.

The sensor window may be rectangular.

The sensor window may be one of at least one sensor window, and the at least one sensor window may collectively extend circumferentially around the axis for at most 90°. The at least one sensor window may include two sensor windows, and each of the sensor windows may extend for at most 45°. The two sensor windows may be rotationally symmetric by 180° around the axis with respect to each other.

With reference to the Figures, a sensor assembly 102 of a vehicle 100 includes a base 104, a housing 106 mounted to the base 104 and rotatable relative to the base 104 around an axis A in a direction of rotation D, a first sensing apparatus 108a inside the housing 106 and rotatable with the housing 106, and a first sensor window 110a extending from a point on the housing 106 in a direction that is radially outward and circumferential relative to the axis A. The first sensor window 110a is flat. The first sensing apparatus 108a has a field of view through the first sensor window 110a. An exterior surface of the first sensor window 110a faces in a direction that is radially outward and circumferentially in the direction of rotation D relative to the axis A.

The direction of rotation D and the shape and orientation of the first sensor window 110a combine to create a lateral airflow across the first sensor window 110a that helps to clean the first sensor window 110a. As the first sensor window 110a rotates with the housing 106 in the direction of rotation D, the first sensor window 110a sweeps unobstructed through the air, i.e., is on a portion of the sensor assembly 102 that pushes through the air. The first sensor window 110a slides past the air surrounding the sensor assembly 102, creating a lateral airflow across the first sensor window 110a, and at the same time pushes that air radially outward relative to the axis A, increasing the pressure of the air against the first sensor window 110a. The airflow relative to the first sensor window 110a can help clean debris from the first sensor window 110a, which can help the first sensing apparatus 108a to detect an environment surrounding the vehicle 100.

With reference to FIG. 1, the vehicle 100 may be any suitable type of automobile, e.g., a passenger or commercial automobile such as a sedan, a coupe, a truck, a sport utility vehicle, a crossover vehicle, a van, a minivan, a taxi, a bus, etc. The vehicle 100, for example, may be an autonomous vehicle. In other words, the vehicle 100 may be autonomously operated such that the vehicle 100 may be driven without constant attention from a driver, i.e., the vehicle 100 may be self-driving without human input. Autonomous operation can be based in part on data received from the sensor assembly 102.

The vehicle 100 includes a vehicle body 112. The vehicle body 112 includes body panels 114 partially defining an exterior of the vehicle 100. The body panels 114 may present a class-A surface, e.g., a finished surface exposed to view by a customer and free of unaesthetic blemishes and defects. The body panels 114 include, e.g., a roof 116, etc.

A casing 118 for the sensor assembly 102 and other sensors is attachable to the vehicle 100, e.g., to one of the body panels 114 of the vehicle 100, e.g., the roof 116. For example, the casing 118 may be shaped to be attachable to the roof 116, e.g., may have a shape matching a contour of the roof 116. The casing 118 may be attached to the roof 116, which can provide the first sensing apparatus 108a and a second sensing apparatus 108b of the sensor assembly 102 with an unobstructed field of view of an area around the vehicle 100. The casing 118 may be formed of, e.g., plastic or metal. The sensor assembly 102 is supported by the casing 118. The sensor assembly 102 can be disposed on top of the casing 118 at a highest point of the casing 118.

Figure 2:
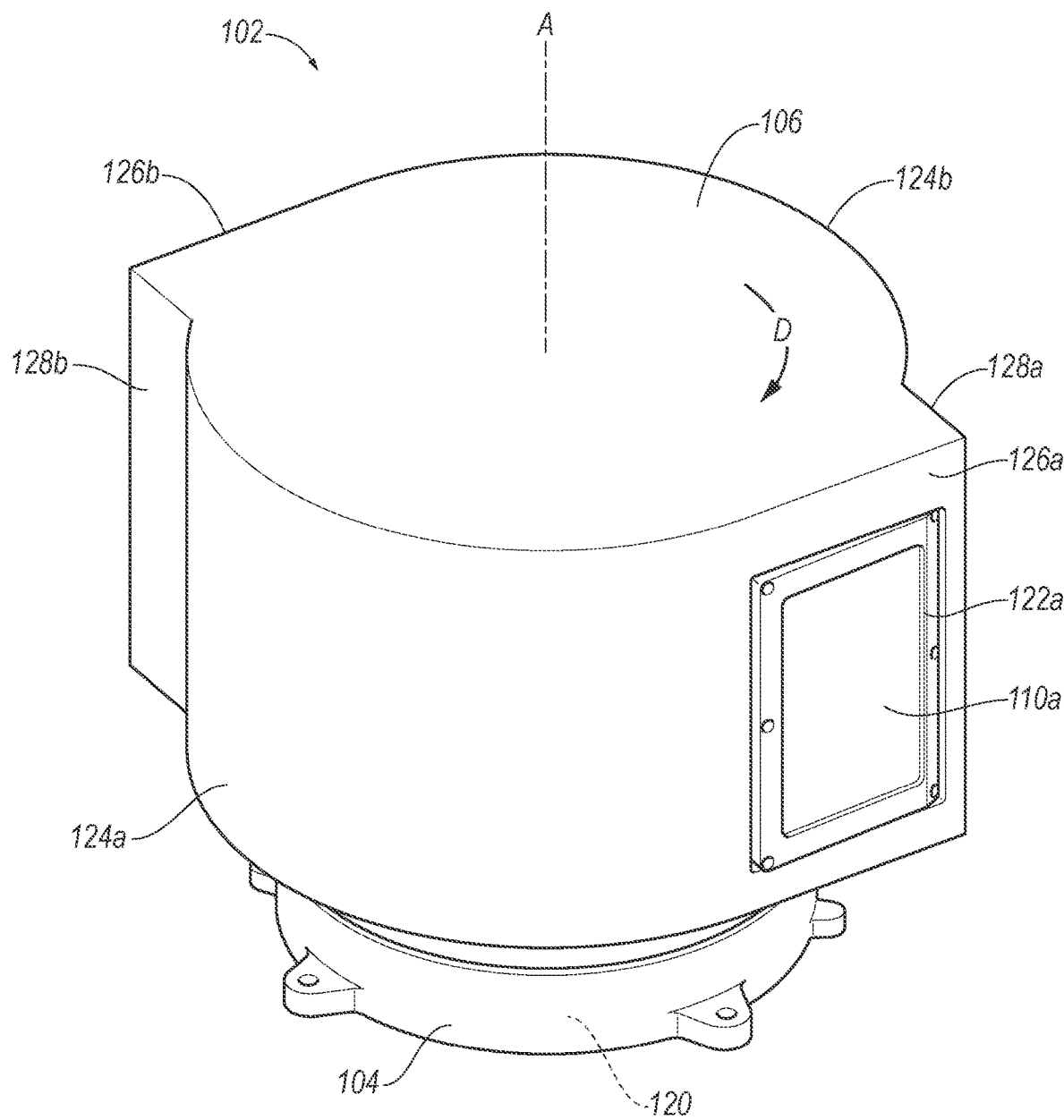
FIG. 2 is a perspective of the sensor assembly.

With reference to FIG. 2, the sensor assembly 102 includes the base 104. The base 104 is attached to the casing 118 on top of the casing 118. The base 104 can be bolted to the casing 118, e.g., through bolt holes in the base 104. The base 104 is mounted to the vehicle 100, e.g., via the casing 118, and the vehicle 100 defines a forward direction F, i.e., a direction of forward travel for the vehicle 100.

The sensor assembly 102 includes a motor 120. The motor 120 is arranged to drivably rotate the housing 106 in the direction of rotation D about the axis A. The motor 120 can be positioned, e.g., inside the base 104. The motor 120 can be, e.g., an electric motor.

The housing 106 is mounted to the base 104 and rotatable relative to the base 104 around the axis A in the direction of rotation D. For example, the housing 106 can be mounted, e.g., fastened, to a sensor body (not shown). The sensor body can be rotatably attached to the base 104 and drivable by the motor 120. The housing 106 can cover a top and sides of the sensor body.

The sensing apparatuses 108 are disposed inside the housing 106 and are rotatable with the housing 106. For example, the sensing apparatuses 108 are mounted to and fixed relative to the sensor body, and thereby fixed relative to the housing 106. The second sensing apparatus 108b can be a same type of sensor as the first sensing apparatus 108a. The sensing apparatuses 108 may be designed to detect features of the outside world; for example, the sensing apparatuses 108 may be radar sensors, scanning laser range finders, light detection and ranging (LIDAR) devices, or image processing sensors such as cameras. In particular, the sensing apparatuses 108 may be LIDAR devices, e.g., scanning LIDAR devices. A LIDAR device detects distances to objects by emitting laser pulses at a particular wavelength and measuring the time of flight for the pulse to travel to the object and back. The first sensing apparatus 108a has a field of view through the first sensor window 110a encompassing a region from which the first sensing apparatus 108a receives input, and the second sensing apparatus 108b has a field of view through a second sensor window 110b encompassing a region from which the second sensing apparatus 108b receives input. As the sensing apparatuses 108 rotate with the housing 106, the fields of view encompass a horizontal 360° around the vehicle 100.

The sensor assembly 102 can include at least one sensor window 110, e.g., two sensor windows 110. The sensor windows 110 are fixed relative to the housing 106 and rotatable with the housing 106. The housing 106 includes respective openings 122, e.g., a first opening 122a and a second opening 122b, in which the sensor windows 110 are positioned.

The sensor windows 110 have a collective circumferential extent around the axis A, that is, a collective angular sweep covered by the sensor windows 110. The circumferential extent around the axis A of each sensor window 110 is an angle θ formed at the axis A between a clockwisemost point and a counterclockwisemost point of that sensor window 110, i.e., an angular sweep around the axis A from one circumferential end of that sensor window 110 to the other circumferential end of that sensor window 110. For example, the sensor windows 110 can collectively extend circumferentially around the axis A for at most 90°. The first sensor window 110a and the second sensor window 110b can each extend circumferentially around the axis A for at most 45°. The comparatively small angular sweep of the sensor windows 110 with respect to the housing 106 provides a small area to keep clean and is accommodated by the fact that the housing 106 and the sensor windows 110 rotate.

The sensor windows 110 can be flat. For example, the sensor windows 110 can have a rectangular shape. The sensor windows 110 are transparent with respect to whatever medium the sensing apparatuses 108 are capable of detecting. For example, if the sensing apparatuses 108 are LIDAR devices, then the sensor windows 110 are transparent with respect to visible light at the wavelength generated and detectable by the sensing apparatuses 108.

Figure 3:
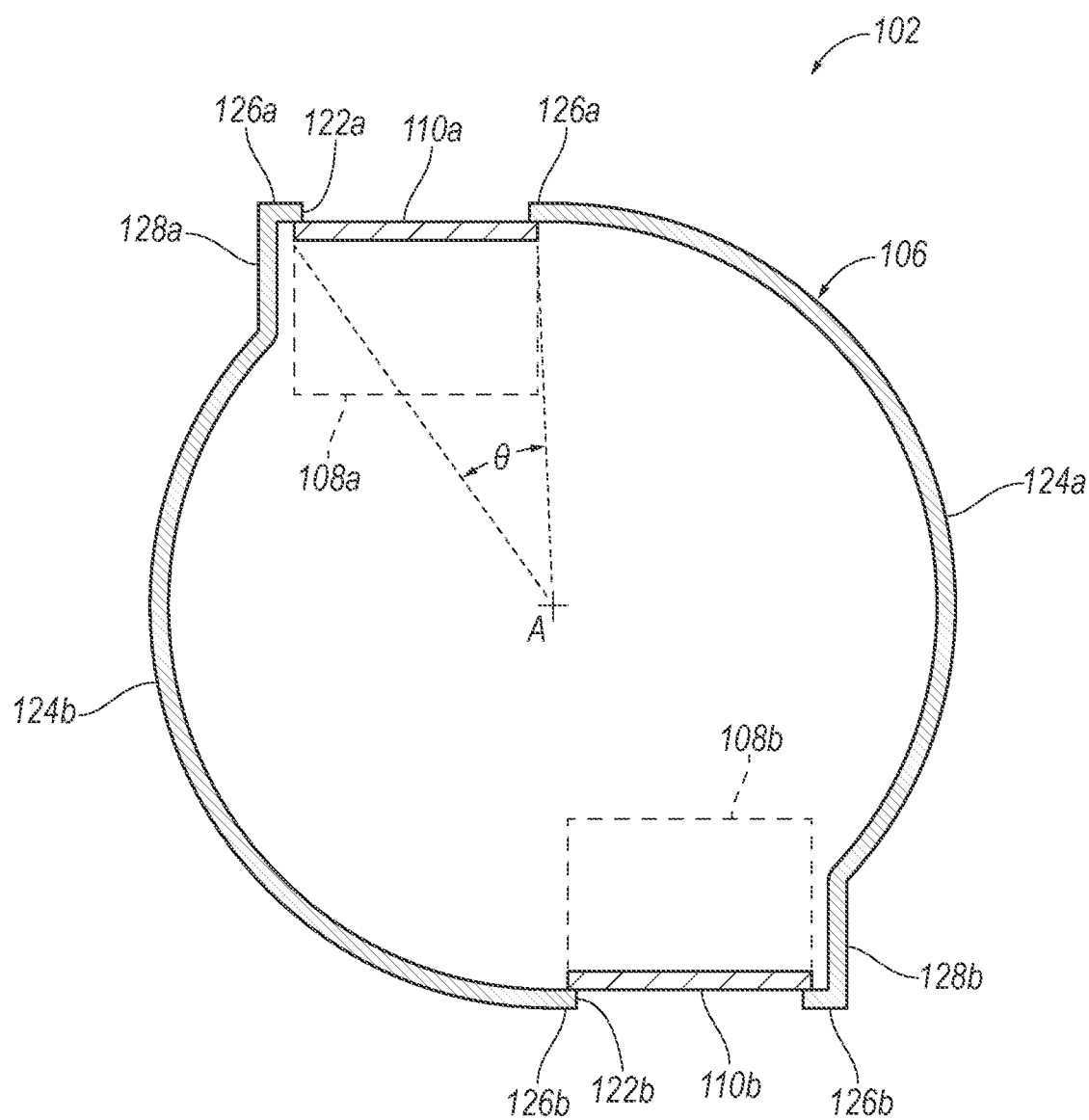
FIG. 3 is a top cross-sectional view of the sensor assembly.

With reference to FIG. 3, the housing 106 includes at least one outer wall 124, at least one window wall 126, and at least one nonwindow wall 128. For example, the housing 106 includes a first outer wall 124a, a first window wall 126a, a first nonwindow wall 128a, a second outer wall 124b, a second window wall 126b, and a second nonwindow wall 128b.

The housing 106 can be rotationally symmetric, e.g., second-degree rotationally symmetric. For the purposes of this disclosure, "rotationally symmetric" means looking the same after some rotation by a partial turn around an axis A. A degree of rotational symmetry is a number of distinct orientations in which something looks the same for each rotation. The housing 106 has second-degree rotational symmetry, and the housing 106 looks the same when rotated by 180° so that the second outer wall 124b, the second window wall 126b, and the second nonwindow wall 128b occupy the space previously occupied by the first outer wall 124a, the first window wall 126a, and the first nonwindow wall 128a, respectively. Specifically, the second outer wall 124b, the second window wall 126b, and the second nonwindow wall 128b are rotationally symmetric by 180° around the axis A with respect to the first outer wall 124a, the first window wall 126a, and the first nonwindow wall 128a, respectively. The sensor windows 110 are also rotationally symmetric by 180° around the axis A with respect to each other. The following descriptions of the first outer wall 124a, the first window wall 126a, the first sensor window 110a, and the first nonwindow wall 128a apply as well to the second outer wall 124b, the second window wall 126b, the second sensor window 110b, and the second nonwindow wall 128b, respectively.

The first outer wall 124a has a partial cylindrical shape extending circumferentially at a constant outer radius from the axis A. The first outer wall 124a extends circumferentially at the constant outer radius from the second nonwindow wall 128b to the first window wall 126a. The first outer wall 124a extends circumferentially for at least 90°. Because of the constant outer radius, the rotational motion of the first outer wall 124a does not displace air for the circumferential extent of the first outer wall 124a, providing smooth airflow onto the first nonwindow wall 128a. The first outer wall 124a extends vertically, i.e., parallel to the axis A, from below the sensor windows 110 to above the sensor windows 110.

The first window wall 126a is flat and parallel to the first sensor window 110a. The first window wall 126a extends completely around the first sensor window 110a, i.e., below, above, and to the sides. The first window wall 126a includes the first opening 122a in which the first sensor window 110a is positioned. The first window wall 126a extends from the first outer wall 124a to the first nonwindow wall 128a. The first window wall 126a extends in a direction tangent to the first outer wall 124a. The first window wall 126a extends vertically, i.e., parallel to the axis A, from below the first sensor window 110a to above the first sensor window 110a.

The first sensor window 110a is parallel to the first window wall 126a. The first sensor window 110a is recessed in the first window wall 126a. The first sensor window 110a extends from a point on the housing 106, e.g., the point on the first opening 122a that is closest to the axis A, which is also a point nearest the first outer wall 124a, in a direction that is radially outward and circumferential relative to the axis A. The first sensor window 110a is disposed farther from the axis A than the outer radius of the first outer wall 124a. An exterior surface of the first sensor window 110a faces in a direction that is radially outward and circumferentially in the direction of rotation D relative to the axis A. For the purposes of this disclosure, a direction that a surface "faces" is a direction that is normal, i.e., perpendicular or orthogonal, to that surface.

The first nonwindow wall 128a extends from the first window wall 126a to the second outer wall 124b. The first nonwindow wall 128a can be flat. The first nonwindow wall 128a extends in a radially inward direction and possibly a circumferential direction from the first window wall 126a relative to the axis A. The first nonwindow wall 128a can be nontangent to the second outer wall 124b. An exterior surface of the first nonwindow wall 128a faces in a direction that is radially outward and circumferentially away from the direction of rotation D relative to the axis A. The first nonwindow wall 128a extends vertically, i.e., parallel to the axis A, from below the sensor windows 110 to above the sensor windows 110.

The housing 106, specifically the first outer wall 124a, the first window wall 126a, the first nonwindow wall 128a, the second outer wall 124b, the second window wall 126b, and the second nonwindow wall 128b, can have a constant cross-section from a bottom of the sensor windows 110 to a top of the sensor windows 110. Except for the openings 122, the housing 106 can have a constant cross-section from a distance below the sensor windows 110 to a distance above the sensor windows 110. The constant cross-section can reduce forces tending to roll or pitch the housing 106 as the housing 106 rotates.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor assembly comprising:
   a base;
   a housing mounted to the base and rotatable relative to the base around an axis in a direction of rotation;
   a sensing apparatus inside the housing and rotatable with the housing; and
   a sensor window extending from a point on the housing in a direction that is radially outward and circumferential relative to the axis, the sensor window being flat;
   wherein the sensing apparatus has a field of view through the sensor window;
   an exterior surface of the sensor window faces in a direction that is radially outward and circumferentially in the direction of rotation relative to the axis;
   the housing includes an outer wall having a partial cylindrical shape extending circumferentially at a constant outer radius from the axis; and
   the sensor window is disposed farther from the axis than the outer radius of the outer wall.

2. The sensor assembly of claim 1, further comprising a motor arranged to rotate the housing in the direction of rotation relative to the base.

3. The sensor assembly of claim 1, wherein the outer wall extends circumferentially around the axis for at least 90°.

4. The sensor assembly of claim 1, wherein the sensor window extends from a point nearest the outer wall in the direction that is radially outward and circumferential relative to the axis.

5. The sensor assembly of claim 1, wherein the sensor window extends circumferentially around the axis for at most 45°.

6. The sensor assembly of claim 1, wherein the sensor window is rectangular.

7. The sensor assembly of claim 1, wherein the sensor window is one of at least one sensor window, and the at least one sensor window collectively extends circumferentially around the axis for at most 90°.

8. The sensor assembly of claim 7, wherein the at least one sensor window includes two sensor windows, and each of the sensor windows extends for at most 45°.

9. The sensor assembly of claim 8, wherein the two sensor windows are rotationally symmetric by 180° around the axis with respect to each other.

10. A sensor assembly comprising:
    a base;
    a housing mounted to the base and rotatable relative to the base around an axis in a direction of rotation;
    a sensing apparatus inside the housing and rotatable with the housing; and
    a sensor window extending from a point on the housing in a direction that is radially outward and circumferential relative to the axis, the sensor window being flat;
    wherein the sensing apparatus has a field of view through the sensor window;
    an exterior surface of the sensor window faces in a direction that is radially outward and circumferentially in the direction of rotation relative to the axis;
    the housing includes an outer wall having a partial cylindrical shape extending circumferentially at a constant outer radius from the axis; and
    the sensor window extends from a point nearest the outer wall in the direction that is radially outward and circumferential relative to the axis.

11. The sensor assembly of claim 10, wherein the housing includes a window wall, the window wall has an opening in which the sensor window is positioned, the window wall is flat and parallel to the sensor window, and the window wall borders the outer wall.

12. The sensor assembly of claim 11, wherein the window wall extends in a direction tangent to the outer wall.

13. The sensor assembly of claim 11, wherein the sensor window is recessed in the window wall.

14. The sensor assembly of claim 11, wherein the housing includes a nonwindow wall, the nonwindow wall borders the window wall, and an exterior surface of the nonwindow wall faces in a direction that is radially outward and circumferentially away from the direction of rotation relative to the axis.

15. The sensor assembly of claim 14, wherein the outer wall, the window wall, and the nonwindow wall have a constant cross-section along the axis from a bottom of the sensor window to a top of the sensor window.

16. The sensor assembly of claim 14, wherein the outer wall, the window wall, and the nonwindow wall collectively extend 180° around the axis.

17. The sensor assembly of claim 16, wherein the sensor window is a first sensor window, the outer wall is a first outer wall, the window wall is a first window wall, the nonwindow wall is a first nonwindow wall, and the housing includes a second outer wall, a second window wall, and a second nonwindow wall that are rotationally symmetric by 180° around the axis with respect to the first outer wall, the first window wall, and the first nonwindow wall.

* * * * *